United States Patent [19]

Meyer et al.

[11] 3,927,012

[45] Dec. 16, 1975

[54] YELLOW SULFUR DYESTUFF AND PREPARATION THEREOF

[75] Inventors: Artur Meyer, Schoneck; Ulrich Gotsmann, Bergen-Enkheim; Ernst Meyer, Frankfurt am Main-Fechenheim, all of Germany

[73] Assignee: Cassella Farbwerke Mainkur AG, Germany

[22] Filed: June 21, 1974

[21] Appl. No.: 481,705

[30] Foreign Application Priority Data

June 27, 1973 Germany............................ 2332558

[52] U.S. Cl...................................... 260/304; 8/33
[51] Int. Cl.$^2$...................................... C07D 277/66
[58] Field of Search..................................... 260/304

[56] References Cited
UNITED STATES PATENTS 406,952   7/1889   Pfitzinger et al.................... 260/304

3,801,587   4/1974   Loewe et al. ...................... 260/304

*Primary Examiner*—R. Gallagher
*Attorney, Agent, or Firm*—Connolly and Hutz

[57] ABSTRACT

Heating a mixture of
A. a member selected from the group consisting of
  i. 2-(p-aminophenyl)-6-methylbenzothiazole,
  ii. the distillate obtained at about 135°C, and at a pressure of 5–6 mm Hg from the product of heating p-toluidine and sulfur to produce (i) and
  iii. a mixture of (i) and (ii);
B. sulfur and
C. phenylene diamine at a temperature of from about 180° to about 400°C., the molar ratio of (A) to (C) being about 2:1 and the molar ratio of (B) to (A) being about 5–7:1, the product produced by said heating and the use of said product in the dyeing of textile fibers.

9 Claims, No Drawings

YELLOW SULFUR DYESTUFF AND PREPARATION THEREOF

It is known, for example, from German Pat. No. 180,162, that the valuable yellow sulfur dyestuff, Sulfur Yellow GG (Color Index 53,160, Sulfur Yellow 4) is obtained by heating 2-(p-aminophenyl)-6-methylbenzothiazole and benzidine in a molar ratio of 1:1 together with sulfur at a temperature exceeding 180°C. However, it is a disadvantageous feature of this method of preparation that the cancerigenic benzidine must be employed.

It is also known (DOS 2,209,077) that a yellow sulfur dyestuff may be prepared without the use of cancerigenic benzidine if a mixture of 2-(p-aminophenyl)-6-methylbenzothiazole, 1,4-diformylaminobenzene and a diphenyldisulfide which is substituted by nitro, amino or by formylamino in the 2,2'- or 4,4'-position, is heated with sulfur and, if necessary, sodium sulfide at temperatures of 220°–260°C. However, if only 2-(p-aminophenyl)-6-methylbenzothiazole and 1,4-diformylaminobenzene are melted together with sulfur, then a product is obtained which is not suitable as a dyestuff. The disadvantage of this process for preparing a benzidine-free yellow sulfur dyestuff is that in addition to sulfur, not only two but three reactants are required.

In accordance with the present invention, it has been discovered that a valuable new yellow sulfur dyestuff may be prepared without the use of cancerigenic benzidine with two easily synthesized starting materials, in addition to sulfur, namely 2-(p-aminophenyl)-6-methylbenzothiazole and phenylene diamine. These two easily synthesized reactants are heated together with sulfur at a temperature of from about 180° to about 400°C. The preferred temperature is from about 250° to 300°C. Although o-, m- and p-phenylene diamine may be used, the preferred phenylene diamine is p-phenylene diamine.

The reactant 2-(p-aminophenyl)-6-methylbenzothiazole, which is also known as dehydrothio-p-toluidine, is prepared industrially by heating p-toluidine and sulfur. See Ullmann's *Encyclopedia of Technical Chemistry*, Third Edition, Vol. 17, pp. 333–334. During this preparation other sulfurized products are produced as by-products. The by-produce distillate obtained at about 135°C. and at a pressure of 5–6 mm Hg as an intermediate run before the main product contains, in addition to small amounts of p-toluidine, up to 50–60% by weight of 1-amino-2-mercapto-4-methylbenzene, as well as small amounts of bis-(2-amino-4-methylphenyl)sulfide and bis-(2-amino-4-methylphenyl)disulfide, as well as other sulfides and disulfides. This distillate or a mixture thereof with 2-(p-aminophenyl)-6-methylbenzothiazole may be used in the process of the present invention in lieu of 2-(p-aminophenyl)-6-methylbenzothiazole. However, when using such distillate or said mixture, the yields and dyestuff fastness decline somewhat.

Heating the mixture of reactants of the present invention is carried out in the normal fashion for preparing sulfur dyestuffs and requires a number of hours, for example, about 20 hours at 280°C. The molar ratio between 2-(p-aminophenyl)-6-methylbenzothiazole, the aforesaid distillate or a mixture thereof on the one hand and phenylene diamine on the other hand is preferably about 2:1. If a larger amount of phenylene diamine is employed, the hue of the dyestuff shifts in the direction of greenish yellow; if less phenylene diamine is employed, the yield of the process declines. Generally, from 5 to 7 and preferably 5.5 to 6 parts by weight of sulfur are used for each part by weight of said benzothiazole, said distillate or mixture thereof.

The novel yellow sulfur dyestuffs of the present invention, especially if prepared with the reactants of 2-(p-aminophenyl-6-methylbenzothiazole, p-phenylenediamine and sulfur are superior to Sulfur Yellow GG with respect to light fastness, fastness to washing and coloring strength and, in addition, are comparable in other properties. Moreover, the dyestuff of the present invention is obtained in good yields and as with many sulfur dyestuffs, the hue of the dyestuff may be varied by changing the reaction temperature and/or reaction time.

The dyestuffs of the present invention may be used for the dyeing of plant fibers such as cotton in accordance with the standard procedure used for dyeing with sulfur dyes. In such dyeing, the dyestuff is converted with reducing agents, usually with sodium sulfide, into an aqueous leuco compound which goes onto the fiber. By oxidation with air or oxidizing agents such as hydrogen peroxide, a dichromate or the like, the leuco compound is reconverted to the insoluble form. The dyestuff of the present invention may be sold in a finished form as a leuco compound in the form of a paste or a solution. For this purpose, the crude dyestuff is boiled with sodium hydroxide, sodium sulfide being formed from the available sulfur, and the dyestuff is reduced. Further sodium sulfide and, if desired, sodium hydrogen sulfide are added and the product is standardized, for the most part, to a pasty consistency. The dyestuffs of this invention may also be converted in known manner into a water-soluble sulfur dyestuff by reaction with aqueous sodium hydrogen sulfite or with aqueous sodium sulfite.

The following examples illustrate the present invention.

EXAMPLE 1

Sulfur in the amount of 140 g. 6 g. p-phenylene diamine, 25.4 g. 2-(p-aminophenyl)-6-methylbenzothiazole and 1 ml. of a defoaming agent are introduced into a melting pot of VA (high-grade) steel and are heated for 5 hours at 270°C. with stirring. The melt is then heated another 16 hours at the same temperature. Thereafter, the melt is allowed to cool and the solidified melt is milled to obtain 158 g. of crude dyestuff in the form of a brown powder.

For purifying the crude dyestuff of this example, 158 ml. sodium hydroxide (38°Be) and 180 ml. water are heated to reflux temperature in a 500 ml. three-necked flask with stirrer and reflux condenser, 1 ml. of a defoaming agent is added and 79 g. of the crude dyestuff is slowly introduced with stirring and heated under reflux for 5 hours. Thereupon, this mixture is diluted to a volume of 900 ml. with 60°–70°C. water and the resulting product is filtered. The filtered residue is washed with 350 ml. 60°–70°C. water. The dyestuff is then separated from the filtrate in a known manner, e.g., by air oxidation or by the addition of acid. For the precipitation with acid, sulfuric acid of a medium concentration is employed and is added in such amount that the pH does not fall below 8. The precipitated dyestuff is filtered with suction and dried. There are obtained about 62 g. of the purified dyestuff. It is soluble in sodium sulfide solution and dyes cotton a deep yellow shade.

EXAMPLE 2

The crude dyestuff prepared in accordance with the first paragraph of Example 1 is converted to a water-soluble dyestuff by the following procedure. In a one l. three-necked flask equipped with stirrer and reflux condenser, 400 ml of water and 316 ml sodium hydroxide (38° Be) are heated to reflux temperature and 1 ml of a defoaming agent is added followed by the slow addition of 158 g of the crude dyestuff powder with stirring. The resulting mixture is heated under reflux for 5 hours. It is then diluted with water to 1.8 l. and the dyestuff is precipitated by bubbling air through the mixture at 60°–70°C. Following further dilution with water to 2.4 l., the precipitated dyestuff is recovered. It is then suspended in 1.8 l. water and 76 g sodium bisulfite (pH 6.7) are added at 60°C. After two hours, the mixture is adjusted to a pH of 7.6 with sodium hydroxide (38° Be) and stirred at 75° –80°C. until solution is completed. Following this, 5 g diatomaceous earth are added and the product is filtered and dried under vacuum. There are obtained in this manner 230 g of a yellow dyestuff which is soluble in water and dyes cotton a deep yellow hue.

EXAMPLE 3

If the p-phenylene diamine of paragraph 1 of Example 1 is replaced by an equal quantity of m-phenylene diamine and the procedure of that paragraph is otherwise the same, there is obtained 155 g of a crude dyestuff in the form of a brown powder. The latter may be purified in accordance with the procedure of Example 1, paragraph 2, except that 77.5 g of the crude dyestuff powder are used. There are obtained 51 g of the purified dyestuff.

EXAMPLE 4

The crude dyestuff prepared in accordance with the procedure of Example 3 may be converted in accordance with the procedure of Example 2 into a water-soluble dyestuff. With the use of 155 g of the crude dyestuff powder, there are obtained 125 g of the water-soluble dyestuff.

EXAMPLE 5

The crude dyestuff obtained in accordance with the first paragraph of Example 1 may be converted into a finished dyestuff preparation by the following procedure. There are introduced into a 500 ml three-necked flask equipped with stirrer and reflux condenser, 205 ml water and 322 ml sodium hydroxide (38° Be) and this mixture is heated to reflux temperature. Following this, with stirring, 158 g of the crude dyestuff obtained in accordance with the first paragraph of Example 1 are slowly introduced and the mixture is held at reflux for 5 hours. It is then filtered and 165 g sodium sulfide (60%), 70 g 33% aqueous sodium hydrosulfide solution (NaSH) and 1023 g water are added to the filtrate. A paste is obtained which may be immediately employed for dyeing.

EXAMPLE 6

A mixture of 0.2 g. of the dyestuff obtained in accordance with Example 1. and 1.5 g. of crystalline sodium sulfide are dissolved in 50 ml. water by boiling for a short time. Thereupon, water is added to give a volume of 200 ml. In this solution, 10 g. of cotton yarn are dyed with the addition of 0.4 g. sodium carbonate and 4 g. sodium sulfate at 80°–90°C. for 45 minutes. Subsequently, the dyed yarn is washed and, as customary with sulfur dyeing, it is oxidized with $H_2O_2$, a dichromate or the like, rinsed and dried. A deep yellow dyeing is thus obtained.

EXAMPLE 7

A total of 250 g. of the dyestuff paste obtained in accordance with Example 5 are diluted with water at a temperature of 30°C. to a volume of 1000 ml. A cotton fabric is padded with the padding dyebath on the pad with a liquor absorption of 70–80%. The padded fabric is immediately transferred into an air-deficient steamer and steamed for 40 seconds at 102°–120°C. Subsequently, it is washed, oxidized in the customary manner, re-washed and dried. A deep yellow dyeing is obtained.

What is claimed is:
1. A process for preparing ayellow sulfur dyestuff which comprises heating a mixture of
   A. a member selected from the group consisting of
      i. 2-(p-aminophenyl)-6-methylbenzothiazole,
      ii. the by-product distillate obtained at about 135°C. and at a pressure of 5–6 mm Hg from the product of heating p-toluidine and sulfur to produce (i), said by-product distillate comprising 1-amino-2-mercapto-4-methylbenzene, bis-(2-amino-4-methylphenyl)sulfide and bis-(2-amino-4-methylphenyl)disulfide,
      iii. a mixture of (i) and (ii);
   B. sulfur and
   C. phenylene diamine at a temperature of from about 180° to about 400°C., the molar ratio of (A) to (C) being about 2:1 and the molar ratio of (B) to (A) being about 5–7:1.
2. The process of claim 1 wherein said temperature is from about 250° to 300°C.
3. The process of claim 1 wherein the molar ratio of (B) to (A) is about 5.5–6:1.
4. The process of claim 1 wherein said (C) is p-phenylene diamine.
5. The process of claim 1 wherein the product obtained by heating said mixture at a temperature of from about 180° to about 400°C. is reacted with aqueous sodium sulfite or sodium hydrogen sulfite to thereby render said product water-soluble.
6. The process of claim 1 wherein the product obtained by heating said mixture at a temperature of from about 180° to about 400°C. is boiled in aqueous sodium hydroxide and converted into the leuco form by the addition of sodium sulfide or sodium hydrogen sulfide.
7. The product produced by the process of claim 1.
8. The product produced by the process of claim 5.
9. The product produced by the process of claim 6.

* * * * *